United States Patent
Freemon

(10) Patent No.: US 6,199,546 B1
(45) Date of Patent: Mar. 13, 2001

(54) FIRE STARTING APPARATUS

(76) Inventor: William E. Freemon, 1708 Trace Mills Dr., Arlington, TX (US) 76014

(*) Notice: Subject to any disclaimer, the term of this patent is extended or adjusted under 35 U.S.C. 154(b) by 0 days.

(21) Appl. No.: 09/576,284

(22) Filed: May 23, 2000

(51) Int. Cl.[7] .................................................. A47J 37/00
(52) U.S. Cl. ...................... 126/25 B; 126/9 B; 126/154; 99/450
(58) Field of Search ................................ 126/25 B, 153, 126/154, 152 R, 9 B; 99/449, 450; 108/29, 31, 149; 211/175; 248/172

(56) References Cited

U.S. PATENT DOCUMENTS

| | | | |
|---|---|---|---|
| D. 259,536 | * 6/1981 | Douglas | D7/129 |
| D. 301,673 | * 6/1989 | Ogden | D7/402 |
| 1,451,195 | 4/1923 | Bagley . | |
| 1,566,504 | * 12/1925 | Pearsall | 126/153 |
| 1,830,230 | * 11/1931 | Gwyer | 126/9 B |
| 1,934,339 | 11/1933 | Winberg . | |
| 2,040,966 | * 5/1936 | Hungerford | 99/422 |
| 3,682,158 | 8/1972 | Thomas . | |
| 4,108,084 | * 8/1978 | Fink | 108/29 |
| 4,162,730 | * 7/1979 | Steere Jre et al. | 211/118 |
| 4,434,780 | * 3/1984 | Hepner | 99/449 |
| 4,955,362 | 9/1990 | Underdown . | |
| 5,076,253 | 12/1991 | Lindstro . | |
| 5,575,275 | 11/1996 | Gazaille . | |
| 5,666,940 | * 9/1997 | Kreiter | 126/9 R |
| 5,839,361 | * 11/1998 | Richter | 99/449 |

\* cited by examiner

*Primary Examiner*—Ira S. Lazarus
*Assistant Examiner*—David Lee

(57) ABSTRACT

The present invention comprises two grills that slide in and out of a center support piece, with the center support piece attaching to the underside of a grate within a fireplace. Each grill of the present invention has a grow frame and a grill screen, with the grow frame fabricated in a rectangular frame, being composed of hollow circular metal tubing. Each grill has two ends, a first end and a second end, two surfaces, a top surface and a bottom surface, and two sides, a first side and a second side. Each grill has a grill screen which is spot welded to the top; surface of the grill frame of each grill. The first end of each grill frame is designed to be inserted into a center support. The second end of each grill frame has two adjustable hooks attached to the top surface of the grill frame with the adjustable hooks allowing the present invention to be attached to the bottom of a fireplace grate with varying degrees of clearance. Each of the adjustable hooks can be fixed at one of several different height levels to allow various degrees of clearance between the top of the present invention and the bottom surface of the fireplace grate. The present invention allows a user to place fire-starter logs or kindling on top of the grill of the present invention between the bottom surface of a fireplace and the wood to be burned, providing an optimum method to start the main fire quickly and easily.

1 Claim, 2 Drawing Sheets

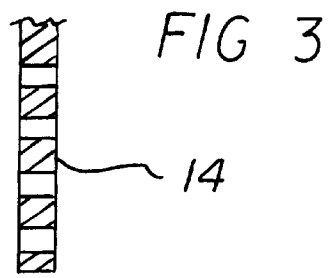
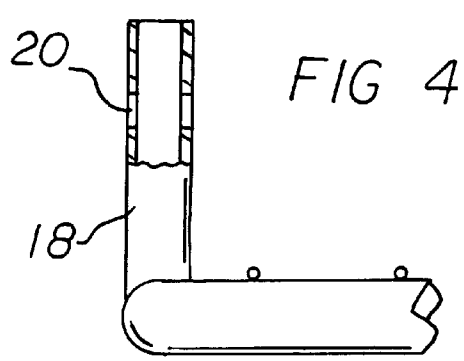
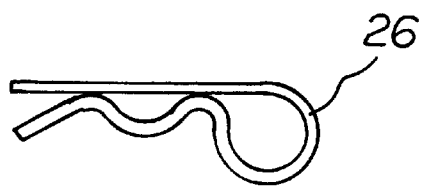
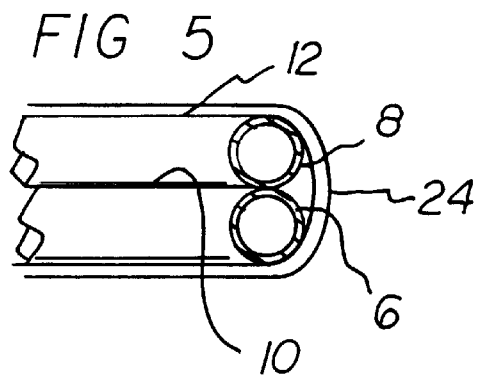
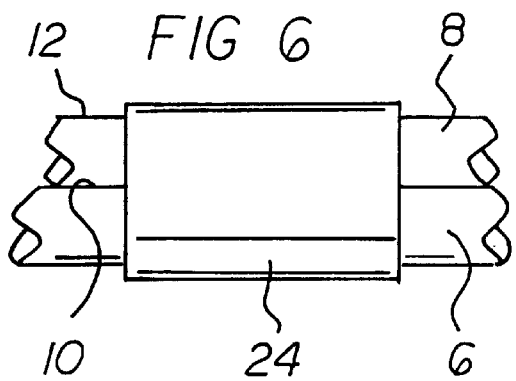
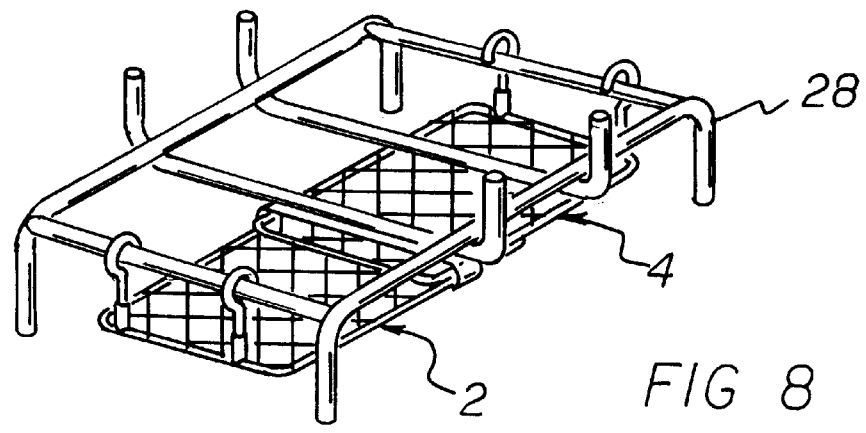

FIRE STARTING APPARATUS

BACKGROUND OF THE INVENTION

The present invention relates to that of a fire starting apparatus, and more particularly relates to that of an adjustable screened grill that is attachable to a underside of a fireplace grate.

DESCRIPTION OF THE PRIOR ART

U.S. Pat. No. 5,575,275, issued to Gazaille, discloses a firelog burner tray for burning a firelog over ground which includes a flat horizontal base plate, an elongated heat reflector, and a number of forwardly extending ribs.

U.S. Pat. No. 5,076,253, issued to Lindstro, discloses a burner which is intended for combustion of wood logs or other similar solid fuels. The burner comprises a bottom plate and a backing plate, which are both inclined towards the horizontal plane, with the two plates containing holes for air.

U.S. Pat. No. 4,955,362, issued to Underdown, discloses a product for use with a fireplace grate comprising a sheet of metal, with the sheet bent upward at its long edges or otherwise formed so that the upper facer thereof when laid flat on a grate is concave.

U.S. Pat. No. 3,682,158, issued to Thomas, discloses a T-shaped trough having a main part arranged to extend parallel with logs on the grate and in a position to produce a flame in the draft space between two spaced apart logs on the grate so that a flame from starter fuel in the trough will rise between the logs and start the burning.

U.S. Pat. No. 1,934,339, issued to Winberg, discloses an improvement in orchard heaters, with the improvement generating sufficient heat in orchards and vineyards to prevent frost from injuring or killing trees, vines or shrubs.

U.S. Pat. No. 1,451,195, issued to Bagley, discloses an invention which is a combined shovel, torch and match holder.

SUMMARY OF THE INVENTION

The present invention comprises two grills that slide in and out of a center support piece, with both of the grills attaching to the underside of a fireplace grate within a fireplace. Each grill of the present invention has a grill frame and a grill screen, with the grill frame fabricated in a rectangular shape and being fabricated from hollow circular metal tubing. Each grill has two ends, a first end and a second end, two surfaces, a top surface and a bottom surface, and two sides, a first side and a second side. Each grill has a grill screen which is spot-welded to the top surface of the grill frame of each grill. The first end of each grill frame is designed to be inserted into a center support. The second end of each grill frame has two adjustable hooks attached to the top surface of the grill frame, with the adjustable hooks allowing the present invention to be attached to the bottom of a fireplace grate with varying degrees of clearance. Each of the adjustable hooks can be fixed at one of several different height levels to allow various degrees of clearance between the top of the present invention and the bottom surface of the fireplace grate. The present invention allows a user to place fire-starter logs or kindling on top of the grill of the present invention between the bottom surface of a fireplace and the wood to be burned, providing an optimum method to start the main fire quickly and easily.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regard as including such equivalent constructions insofar as they do not depart from the spirit and scope of the present invention.

It is therefore an object of the present invention to provide a new and improved fire starting apparatus which has all the advantages of the prior art and none of the disadvantages.

It is another object of the present invention to provide a new and improved fire starting apparatus which may be easily and efficiently manufactured and marketed.

It is another object of the present invention to provide a new and improved fire starting apparatus which is of durable and reliable construction.

It is yet another object of the present invention to provide a new and improved fire starting apparatus which is economically affordable and available to the buying public.

It is still another object of the present invention to provide a new and improved fire starting apparatus that is a grill surface in which to place kindling or fire starter logs.

It is still yet another object of the present invention to provide a new and improved fire starting apparatus in which the grill surface is adjustable and can be suspended from a fireplace grate within a fireplace.

It is further still yet another object of the present invention to provide a new and improved fire starting apparatus that is able to withstand high temperatures.

It is still yet another object of the present invention to provide a new and improved fire starting apparatus in which the grill surface is height-adjustable.

It is yet another object of the present invention to provide a new and improved fire starting apparatus that will allow a user to quickly, easily, and cleanly start a fire.

It is still yet another object of the present invention to provide a new and improved fire starting apparatus that is easy to assemble and disassemble.

Other objects, features and advantages of the present invention will become more readily apparent from the following detailed description of the preferred embodiment when considered with the attached drawings and appended claims.

BRIEF DESCRIPTION OF THE DRAWINGS

FIG. 3 shows a side view of a hook of the present invention.

FIG. 4 shows a side view of an upright frame tubing of the present invention.

FIG. 5 shows a front view of the present invention after both grills have been inserted through the center support piece.

FIG. 6 is a side view of the center support piece.

FIG. 7 shows a side view of the wire form key used with the present invention.

FIG. 8 shows the present invention in use on a fireplace grate.

DESCRIPTION OF THE PREFERRED EMBODIMENT

Figure 1:
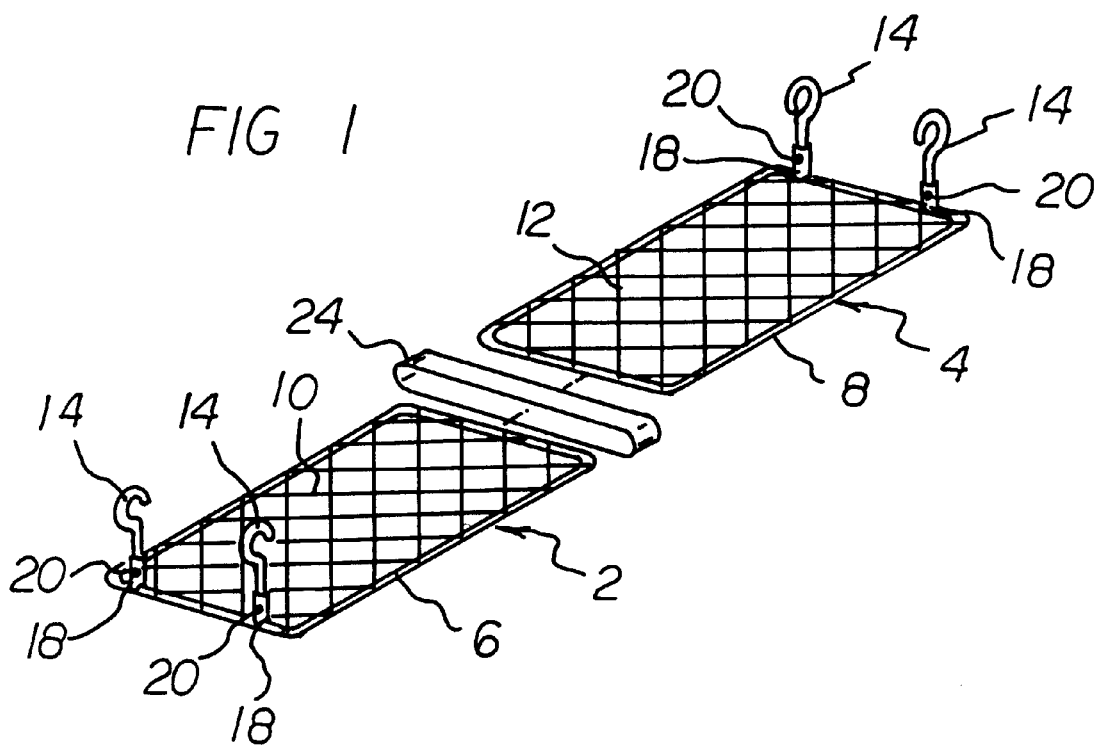
FIGS. 1 and 2 show a perspective view of the various parts of the present invention.
Figure 2:
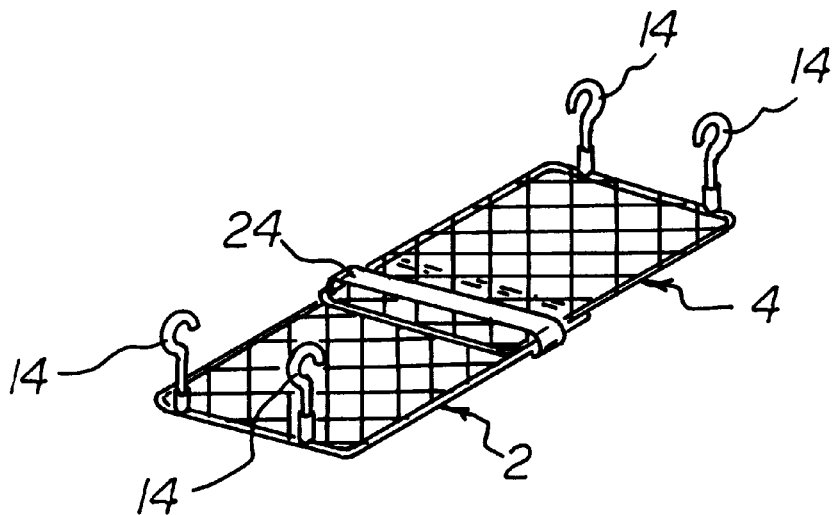

FIGS. 1 and 2 show a perspective view of the various parts of the present invention. Grills 2 and 4 can be seen, with grills 2 and 4 having an outer frame fabricated from grill frames 6 and 8, respectively. Grill frame 6 would have grill screen 10 spot-welded to the top surface of grill frame 6, while grill frame 8 would have grill screen 12 spot-welded to the top surface of grill frame 8. Grill screens 10 and 12 would be fabricated from metal.

Grill frames 6 and 8 would be fabricated from steel tubing, which would be purchased in linear form. Grill frames 6 and 8 would be formed from a linear form of the steel tubing by the use of a programable hydraulic tubing bender. Then, the ends of the tubing would be welded together using TIG, MIG, or laser welding techniques.

Both grills 2 and 4 would be fabricated in a rectangular shape. Both grills 2 and 4 would have two ends, a first end and a second end, and would have two sides, a first side and a second side. The ends of grills 2 and 4 would be defined as the two edges that are shorter in length than the other two parallel sides.

The first end of grill 2 would have a pair of upright frame tubings 18 attached to the top surface of grill frame 6 of grill 2. Each upright frame tubing 18 has two ends, a top end and a bottom end. The bottom would be the end attached to the top surface of grill frame 6 of grill 2. The top end of each upright frame tubing 18 would be open. Each upright frame tubing 18 would have a single tubing hole 20, with each tubing hole 20 traveling completely through upright frame tubing 18 in a direction planar with the first side and second side of grill 2. Each upright frame tubing would be capable of receiving for placement the shank of a hook 14 for being removably placed within upright frame tubing 18.

The first end of grill 4 would have a pair of upright frame tubings 18 attached to the top surface of grill frame 8 of grill 4. Each upright frame tubing 18 has two ends, a top end and a bottom end. The bottom would be the end attached to the top surface of grill frame 8 of grill 4. The top end of each upright frame tubing 18 would be open. Each upright frame tubing 18 would have a single tubing hole 20, with each tubing hole 20 traveling completely through upright frame tubing 18 in a direction planar with the sides of grill 4. Each upright frame tubing 18 would be capable of receiving placement the shank of a hook 14 for being removably placed within upright frame tubing 18.

Also, center support 24 can be seen. The second ends of both grills 2 and 4 would be inserted through center support 24 to maintain the present invention in a fixed position. Center support 24, with grills 2 and 4 inserted into center support 24, can best be seen in FIG. 2, after the second ends of both grills 2 and 4 have been inserted through center support 24.

FIG. 3 shows a side view of hook 14 of the present invention. The shank of each hook 14 has a minimum of four holes 16 drilled through the shaft of hook 14. The holes located in hook 14 would be equally spaced apart, and would be drilled completely through the shaft of hook 14 along the same plane as the first and second side of grill 2. The four holes 16 located in hook 14 are used to easily raise and lower the frame of the present invention once it is attached to the fireplace grate.

FIG. 4 shows a side view of an upright frame tubing 18 of the present invention. Upright frame tubing 18 is purchased in linear form, and is cut and formed to the appropriate shape using a programable hydraulic tubing bender. Then, the end of the upright frame tubing would be welded to the grill frame using TIG, MIG, or laser welding techniques. The inner diameter of upright frame tubing 18 is designed to allow hook 14 to be inserted into the top end of upright frame tubing 18 using a clearance fit of greater than 0.005 of an inch. Further, upright frame tubing 18 is of sufficient thickness to provide sufficient strength over the temperature extremes the present invention would face when used to start a fire in a fireplace.

As can be seen in FIG. 4, upright frame tubing 18 has a single tubing hole 20, with the tubing hole 20 going completely through upright frame tubing 18 in a manner planar to the first side and second side of each grill, whether it be grill 2 or grill 4. In using each upright frame tubing 18 with the respective hook 14, a user could match up one of the four holes 16 on hook 14 with tubing 20 on upright frame tubing 18, and then insert wire form key 26 through tubing hole 20 and the hole 16 that would be in alignment. A user would perform this task with each of the four upright frame tubings 18 and the respective hook 14 to allow for proper clearance of the present invention under a fireplace grate, and the particular hole 16 on each hook 14 that would be used would depend on many factors, including the shape, size, height, and other dimensions of a fireplace grate that a particular user would be using.

FIG. 5 shows a front view of the present invention after grills 2 and 4 have been inserted through center support 24. This diagram is meant to represent the portions of grills 2 and 4 that overlap each other within center support 24. As can be seen, grill 2 rests on top of grill 4.

FIG. 6 is a side view of center support 24, showing grill 2 located on top of grill 4. Center support 24 is made of two stamped pieces of two inch wide steel. The two stamped pieces of two inch wide metal are welded together at the edges using TIG, MIG, or laser welding techniques.

FIG. 7 shows a side view of wire form key 26. Although wire form key 26 would be the preferred choice to lock each hook 14 to a particular height, the present invention is not limited to a wire form key 26 that has the appearance that is present in FIG. 7. A wide variety of different types of wire form keys or other devices could be used to effectively fix each hook 14 at a specific height and still stay within the parameters, metes and bounds of the present invention.

FIG. 8 shows the present invention in use on a fireplace grate 28. As can be seen, the present invention would allow a user to place kindling or other small materials in between the floor surface within a fireplace and the bottom of a fireplace grate, thereby assisting a user when starting a fire. The present invention allows a user to place kindling and fire starter logs in a manner that will effectively start a fire and to encourage the burning of larger logs. Further, the present invention is a great improvement over the prior art and would save a user both time and effort in starting a fire in a fireplace.

What I claim as my invention is:

1. A kindling burner grill comprising:
   a. a center support,
   b. a first grill comprising a first grill frame and a first grill screen, the first grill including two ends, a first end and a second end, the first grill frame fabricated from steel tubing in a rectangular framework, the first grill also including two sides, a first side and a second side, and two surfaces, a top surface and a bottom surface, the first grill screen spot welded to the top surface of the first grill frame, whereby the second end of the first grill would be inserted through the center support,
   c. a second grill comprising a second grill frame and a second grill screen, the second grill including two ends, a first end and a second end, the second grill frame fabricated from steel tubing in a rectangular framework, the second grill also including two sides, a first side and a second side, and two surfaces, a top surface and a bottom surface, the second grill screen spot welded to the top surface of the second grill frame, whereby the second end of the second grill would be inserted through the center support,
   d. a fireplace grate,
   e. a means for adjustably suspending the first grill, the second grill, and center support from the fireplace grate, wherein said means comprises (i) a quartet of upright frame tubings, with two of the upright frame tubings being attached to the top surface of the second end of the second grill, and the other two of the upright frame tubings being attached to the top surface of the second end of the first grill, with each upright frame tubing having a horizontal tubing hole, (ii) a quartet of hooks, each having a shank, each shank of each hook having at least four horizontal holes drilled through the shank, each hook being inserted into an upright frame tubing, (iii) at least four wire form keys, each wire form key designed to be inserted through one of the holes in a hook and the tubing hole in a upright frame tubing in an effort to set the extension length of each hook to a specific height, (iv) whereby a user would attach at least two hooks to the bottom of the fireplace grate to provide a space for kindling and fire starter logs to be placed to start a fire.

\* \* \* \* \*